United States Patent
Schneider et al.

(10) Patent No.: US 10,233,078 B2
(45) Date of Patent: Mar. 19, 2019

(54) PROCESS FOR UTILIZING BLAST FURNACE GASES, ASSOCIATED GASES AND/OR BIOGASES

(71) Applicants: BASF SE, Ludwigshafen (DE); Linde AG, Munich (DE); ThyssenKrupp Industrial Solutions AG, Essen (DE)

(72) Inventors: Christian Schneider, Wuerzburg (DE); Andreas Bode, Mannheim (DE); Dirk Klingler, Mannheim (DE); Otto Machhammer, Mannheim (DE); Philipp Brueggemann, Mannheim (DE); Matthias Kern, Deidesheim (DE); Wolfgang Alois Hormuth, St Martin (DE); Marcus Guzmann, Muensing (DE); Rene Koenig, Neustadt (DE); Jens Bernnat, Gruenstadt (DE); Grigorios Kolios, Neustadt (DE); Volker Goeke, Geretsried (DE); Hans-Juergen Maass, Dresden (DE); Karsten Bueker, Dortmund (DE)

(73) Assignees: BASF SE, Ludwigshafen (DE); Linde AG, Munich (DE); ThyssenKrupp Industrial Solutions AG, Essen (DE)

( * ) Notice: Subject to any disclaimer, the term of this patent is extended or adjusted under 35 U.S.C. 154(b) by 540 days.

(21) Appl. No.: 14/653,482

(22) PCT Filed: Dec. 13, 2013

(86) PCT No.: PCT/EP2013/076598
§ 371 (c)(1),
(2) Date: Jun. 18, 2015

(87) PCT Pub. No.: WO2014/095661
PCT Pub. Date: Jun. 26, 2014

(65) Prior Publication Data
US 2016/0068390 A1    Mar. 10, 2016

(30) Foreign Application Priority Data

Dec. 18, 2012 (EP) ................................. 12197657

(51) Int. Cl.
*C01B 3/34* (2006.01)
(52) U.S. Cl.
CPC ...... *C01B 3/344* (2013.01); *C01B 2203/0222* (2013.01); *C01B 2203/0238* (2013.01);
(Continued)
(58) Field of Classification Search
CPC ............ C01B 3/344; C01B 2203/0222; C01B 2203/1235
(Continued)

(56) References Cited

U.S. PATENT DOCUMENTS

2003/0182861 A1  10/2003 Weimer et al.
2006/0140848 A1   6/2006 Weimer et al.
(Continued)

FOREIGN PATENT DOCUMENTS

CH      409 890 A      3/1966
CN    101649233 B     12/2012
(Continued)

OTHER PUBLICATIONS

U.S. Appl. No. 14/652,346, filed Jun. 15, 2015, Kern, et al.
(Continued)

*Primary Examiner* — Douglas B Call
(74) *Attorney, Agent, or Firm* — Oblon, McClelland, Maier & Neustadt, L.L.P.

(57) ABSTRACT

The invention relates to a process for utilizing a hydrocarbon-comprising and/or carbon dioxide-comprising coproduct gas, accompanying gas and/or biogas, wherein hydrocarbon-comprising and/or carbon dioxide-comprising coproduct gas, accompanying gas and/or biogas is intro-
(Continued)

duced into a reaction space and the multicomponent mixture comprised in the coproduct gas, accompanying gas and/or biogas is converted in a high-temperature zone at temperatures of more than 1000° C. and in the presence of a carrier into a product gas mixture which comprises more than 95% by volume of $CO$, $CO_2$, $H_2$, $H_2O$, $CH_4$ and $N_2$ and optionally into a carbon-comprising solid which is deposited to an extent of at least 75% by weight, based on the total mass of the carbon-comprising solid, on the carrier where the flow velocity of the gas mixture of coproduct gas, accompanying gas and/or biogas in the reaction zone is less than 20 m/s.

14 Claims, 1 Drawing Sheet

(52) U.S. Cl.
 CPC .. *C01B 2203/0244* (2013.01); *C01B 2203/06* (2013.01); *C01B 2203/085* (2013.01); *C01B 2203/0844* (2013.01); *C01B 2203/0855* (2013.01); *C01B 2203/0861* (2013.01); *C01B 2203/0883* (2013.01); *C01B 2203/1235* (2013.01)

(58) Field of Classification Search
 USPC ........................................................ 423/650
 See application file for complete search history.

(56) References Cited

U.S. PATENT DOCUMENTS

| | | |
|---|---|---|
| 2009/0203519 A1 | 8/2009 | Abatzoglou et al. |
| 2009/0314993 A1 | 12/2009 | Zhang et al. |
| 2011/0089378 A1 | 4/2011 | Sato et al. |
| 2011/0193026 A1 | 8/2011 | Weimer et al. |
| 2011/0200520 A1* | 8/2011 | Ramkumar ............ B01D 53/10 423/656 |
| 2012/0190539 A1 | 7/2012 | Zhang et al. |
| 2014/0217327 A1* | 8/2014 | Mass ...................... C01B 3/344 252/373 |

FOREIGN PATENT DOCUMENTS

| | | |
|---|---|---|
| DE | 38 05 397 A1 | 8/1989 |
| EP | 0 191 522 A2 | 8/1986 |
| EP | 0 200 880 A2 | 11/1986 |
| GB | 877 359 A | 9/1961 |
| JP | 56-8408 A | 1/1981 |
| RU | 112 841 U1 | 1/2012 |
| WO | WO 2010/144544 * | 12/2010 |
| WO | WO2013/004391 * | 1/2013 |
| WO | WO 2013/004391 A1 | 1/2013 |

OTHER PUBLICATIONS

International Search Report dated Feb. 7, 2014 in PCT/EP2013/076598.

N. Muradov, et al., "Fossil hydrogen with reduced $CO_2$ emission: Modeling thermocatalytic decomposition of methane in a fluidized bed of carbon particles" International Journal of Hydrogen Energy, vol. 30, No. 10, XP027750548, 2005, pp. 1149-1158.

Ukrainian Office Action dated Jun. 22, 2017 in Patent Application No. 15007131.

* cited by examiner

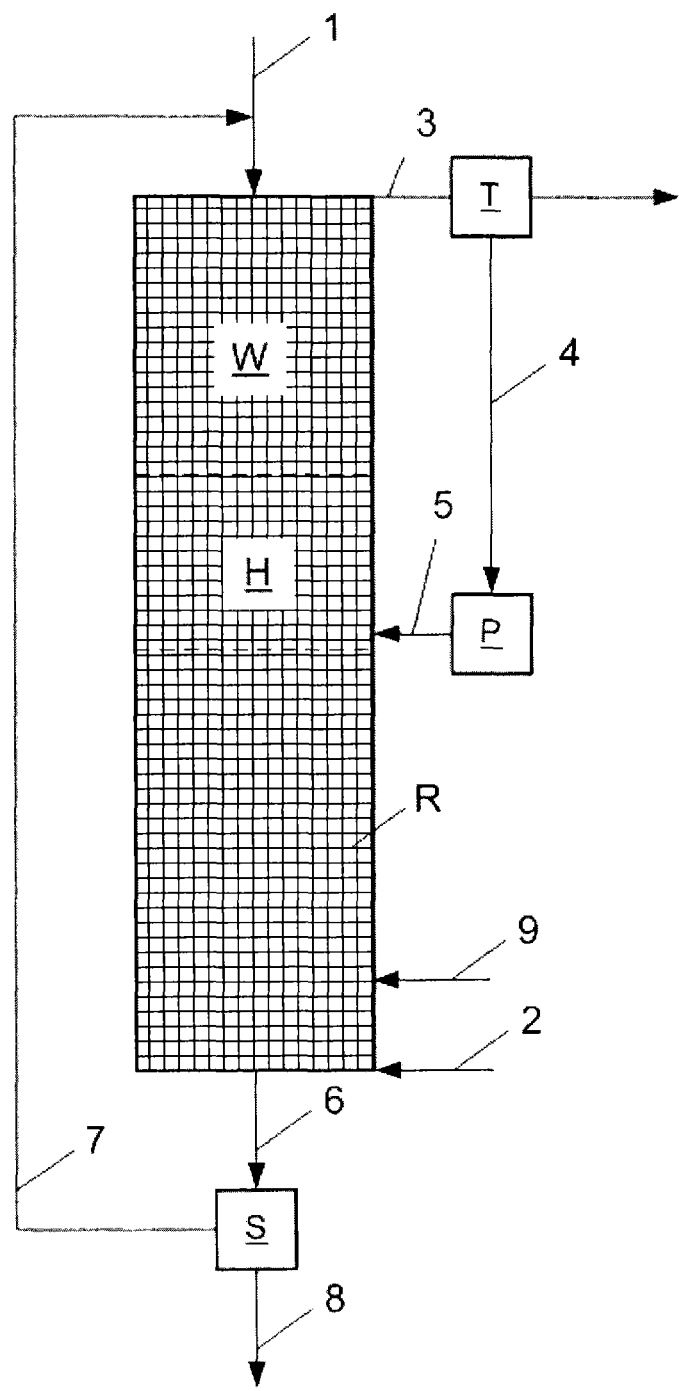

PROCESS FOR UTILIZING BLAST FURNACE GASES, ASSOCIATED GASES AND/OR BIOGASES

The invention relates to a process for utilizing, as material, coproduct gases, accompanying and/or biogases whose main constituents are varying proportions of C1 to C4 alkanes, primarily methane, also hydrogen, water vapor, carbon monoxide and carbon dioxide.

For the present purposes, a coproduct gas is a combustible residual gas or flue gas which is obtained in the production of basic industrial materials. Examples of coproduct gases are converter gas and blast furnace gas, which consist largely of carbon monoxide, nitrogen and carbon dioxide, and also methane-comprising coking plant gas (coke oven gas) in which more than 50% of hydrogen can also be present in addition to methane, carbon monoxide and nitrogen.

Since the separation of the substances comprised in the coproduct gases is complex in process engineering terms, energy-intensive and only in the rarest cases economical, these gases are at present predominantly used as fuel in specific power stations or burnt, or after-burnt, in a flare. This produces climate-damaging carbon dioxide which is released into the atmosphere. Utilization as material of coproduct gases is also made difficult by the high solids content and the high sulfur content, which in catalytic processes would poison or carbonize the catalyst.

As early as the 1980s, some consideration was given to using coproduct gases, in particular for methanation of carbon constituents and subsequent use in the synthesis of methanol:

JP-56-8408 discloses mixing coke oven gas and converter gas in a volume ratio of $H_2$ to CO of 3 and then methanating the mixture. The methane-rich gas is, after further treatment by addition of oxygen, partially oxidized to methanol over a CrO catalyst.

EP 200880 describes, on the basis of JP-56-8408, mixing coke oven gas or treated coke oven gas with converter gas in a volume ratio of $H_2$ to CO of about 2 and then using the mixture directly in a methanol synthesis.

DE 3805397 discloses a catalytic process for preparing methanol from coke oven gas and smelter gas.

The TREMP process of Haldor-Topsoe (published in CN 101649233 B) describes a process for the utilization as material of the volatile products from coal gasification. In order to obtain a defined, reproducible composition, the CO- and $H_2$-rich gas is converted in a methanation step into synthetic natural gas. It is stated that a series of catalysts and absorbents/adsorbents are used in order to remove chlorine, oxygen, tar and other catalyst poisons, and also unsaturated hydrocarbons.

Disadvantages of the processes described are that (i) the methanation has a low efficiency since it is an exothermic process at a low temperature level so that the waste heat from the process is difficult to utilize; (ii) the methanation is a volume-reducing equilibrium reaction and a high pressure, typically greater than 50 bar, is therefore required in order to achieve economically feasible conversions; (iii) a catalyst is necessary and, owing to carbonization and poisoning, has to be replaced regularly, in extreme cases every 5 to 300 seconds, and (iv) the methanation is a step backward in the value added chain since the synthetic natural gas has to be converted back into synthesis gas after the methanation.

Furthermore, thought has been given to the use of the coproduct gases as coke substitute in the blast furnace process.

For the purposes of the present invention, accompanying gas is a fossil fuel gas which is given off from oil wells and stratum petroleum during degassing in petroleum recovery. Depending on the oil field, from 25 to 800 $m^3$ of gas are obtained per metric ton of petroleum.

Since an accompanying gas can be processed or transported only with difficulty, it is often flared or reinjected into the reservoir to maintain the pressure.

For the purposes of the present invention, the term biogas refers to a combustible gas which is formed by fermentation of biomass of any type. Biogas is produced in biogas plants in which both the waste and renewable raw materials are fermented.

Biogas is at present used for generating electric energy, for operating vehicles or for introduction into a gas supply grid.

$CO_2$ emissions in Germany in 2010 were abut 960 million metric tons of $CO_2$ equivalent, with the chemical industry contributing about 5%. From ecological and economic points of view, there are great incentives in the chemicals sector to reduce the $CO_2$ emissions by changing the raw materials basis, using low-$CO_2$ production technologies, optimizing energy requirements and, in particular, utilizing process-related $CO_2$ to produce large-volume basic chemicals. Suitable basic chemicals are, for example, hydrogen and synthesis gas, a mixture consisting of hydrogen and carbon monoxide. The latter forms an ideal interface to existing petrochemical processes for the production of, for example, methanol, dimethyl ether or Fischer-Tropsch products. The worldwide demand for hydrogen and synthesis gas is at present 50 million metric tons per annum and 220 million metric tons per annum, respectively.

Synthesis gas is at present produced industrially by the steam reforming process. In the steam reforming process, hot steam is mixed with the gas to be reformed (for example natural gas) or with vaporized liquid (for example naphtha) and reacted in the gas phase over a heterogeneous catalyst with continual introduction of energy.

The production of synthesis gas having a hydrogen to carbon monoxide ratio of from 1.0 to 2.0 by steam reforming is problematical. This ratio of $H_2$/CO is of particular importance for downstream utilization in the field of fuels and chemicals and represents a particular challenge for steam reforming since catalysts which are particularly stable to carbonization are required here. Alternative processes for producing synthesis gas having an $H_2$/CO ratio of from 1.0 to 2.0 are the autothermal reforming of natural gas and partial oxidation. Both processes are employed industrially, but require the use of pure oxygen which is obtained by fractionation of air. For example, the partial oxidation of natural gas requires a theoretical molar ratio of $O_2$:$CH_4$=1:2 in the feed. The highly energy-consuming cryogenic fractionation of air is therefore a critical cost factor in the latter two processes.

One possibility for utilizing carbon dioxide as material is the reforming of methane and carbon dioxide since this process firstly enables the basic chemical synthesis gas to be produced and secondly enables carbon dioxide to be bound chemically so as to avoid emission into the atmosphere.

Numerous scientific publications and patents are concerned with the production of synthesis gas by means of carbon dioxide reforming of methane. It is known that nickel-comprising or noble metal-comprising catalysts can be used for this carbon dioxide reforming of methane (also known as dry reforming).

Owing to the Boudouard equilibrium and the thermal decomposition of methane, carbon is formed and this deposits, inter alia, on the catalyst and poisons the latter.

To counter these problems, US 2009/203519 proposes the use of an iron-comprising deposition catalyst on which carbon formed deposits. However, the uptake capacity of the deposition catalyst is limited, so that catalyst regeneration, for example by means of a fluid, has to be carried out at regular intervals. Furthermore, US 2009/203519 does not disclose a technical solution in respect of supply of heat to the strongly endothermic reforming reaction.

US 2011/0089378 describes the preparation of catalysts such as $BaCO_3$—$Ba_2TiO_4$ (1:1)/NiO (catalyst A), $Sr_2TiO_4$/NiO (catalyst B), $BaCO_3$—$BaAl_2O_4$ (2:1)/NiO and their use in the dry reforming of methane. The catalyst, which is resistant to carbonization for at least 8 hours, is in principle suitable for achieving a continuous mode of operation. However, this solution is associated with the disadvantage of high catalyst costs.

WO 2013/4391 discloses a process for producing synthesis gas in which methane and carbon dioxide are reacted in a bed of carbon-comprising solid. It is mentioned that it is equally possible to react coproduct gases such as coke oven gas and/or converter gas and/or gases from cupola furnaces since these comprise both methane and carbon dioxide. Although it is stated in WO 2013/004391 that a synthesis gas without significant solids contamination is obtained, the process parameters which have to be adhered to in order to achieve this are not described in detail.

It is an object of the present invention to provide a process which uses hydrocarbon-comprising, in particular methane-comprising, and/or carbon dioxide-comprising coproduct gases, accompanying gases and/or biogases as starting material and thus utilizes them as material. A further object of the present invention is to convert the multi-component coproduct gas mixture of relatively long-chain hydrocarbons, in particular aromatics, and/or undesirable solids and/or sulfur-comprising compounds into a defined gas mixture of less concrete gases which can advantageously be separated from one another by methods known to those skilled in the art and thus be able to introduce them into the value added chain of materials. A further object of the present invention is to provide a process which is resistant/robust in respect of the presence of dust and typical catalyst poisons. A further object is also to provide a process for utilizing, as material, the hydrocarbon-comprising, in particular methane-comprising, and/or carbon dioxide-comprising coproduct gases, accompanying gases and/or biogases which does not require active metal-comprising catalysts. A further object was to provide a process for synthesis gas production which can produce not only a fixed hydrogen to carbon monoxide ratio but in which the hydrogen to carbon monoxide ratio can be controlled in accordance with requirements. Furthermore, it is an object of the present invention to provide synthesis gas and hydrogen having a low $CO_2$ footprint for the chemical industry.

For the purposes of the present invention, relatively long-chain hydrocarbons are hydrocarbons having a basic carbon framework of more than two carbon atoms.

This object is achieved according to the invention by a process in which the hydrocarbon-comprising and/or carbon dioxide-comprising coproduct gas, accompanying gas and/or biogas is introduced into a reaction space and the multi-component mixture comprised in the coproduct gas, accompanying gas and/or biogas is converted in a high-temperature zone at temperatures of more than 1000° C. in the presence of a carrier into a product gas mixture which comprises more than 95% by volume of CO, $CO_2$, $H_2$, $H_2O$, $CH_4$ and $N_2$ and optionally into a carbon-comprising solid which is deposited to an extent of at least 75% by weight, based on the total mass of the carbon-comprising solid formed, on the carrier where the flow velocity of the gas mixture of coproduct gas, accompanying gas and/or biogas in the reaction zone is less than 20 m/s.

For the purposes of the present invention, a carbon-comprising solid is a product which advantageously comprises at least 90% by weight, preferably at least 95% by weight, particularly preferably at least 98% by weight, in particular at least 99% by weight, of carbon.

The flow velocity of the gas mixture of coproduct gas, accompanying gas and/or biogas in the reaction zone is advantageously less than 10 m/s, preferably less than 5 m/s, in particular less than 1 m/s.

The generic term coproduct gas comprises, in particular, carbon dioxide-comprising blast furnace gas and converter gas and also methane-containing coke oven gas having the following composition:

Blast furnace gases typically comprise from 40 to 70% by volume of nitrogen, preferably 45-60% by volume of nitrogen, 20-30% by volume of carbon monoxide, 20-25% by volume of carbon dioxide and 2-4% by volume of hydrogen.

The converter gases typically comprise 10-20% by volume of carbon dioxide, 60-70% by volume of carbon monoxide, 15-25% by volume of nitrogen, preferably 15-20% by volume of nitrogen and 1-5% by volume of hydrogen.

The coking plant gases typically comprise 50-65% by volume of hydrogen, preferably 50-60% by volume of hydrogen, from 15 to 50% by volume of methane, preferably 20-30% by volume of methane, 5-15% by volume of nitrogen and 1-10% by volume of carbon monoxide and 0-5% by volume of carbon dioxide.

The coproduct gas from a blast furnace operator is advantageously composed of from 80 to 90% by volume of blast furnace gas, from 1 to 10% by volume of converter gas and from 1 to 10% by volume of coke oven gas, for example of 85% by volume of blast furnace gas, of 5% by volume of converter gas and of 5% by volume of coke oven gas.

The accompanying gas advantageously comprises methane, ethane, ethylene, propane, propylene and butane and advantageously has the following composition: from 75 to 85% by volume of methane, from 1 to 10% by volume of ethane, from 1 to 10% by volume of propane, from 1 to 10% by volume of butane, from 0.1 to 5% by volume of nitrogen and from 0 to 1% by volume of carbon dioxide, for example 81% by volume of methane, 5% by volume of ethane, 6% by volume of propane, 4% by volume of butane, 1% by volume of nitrogen and <0.15% by volume of carbon dioxide.

The biogas advantageously has the following composition: 50-70% by volume of methane, 30-40% by volume of $CO_2$ and 1-15% by volume of $N_2$.

Depending on the utilization opportunity, it is also possible to use mixtures of various proportions of coke oven gas, blast furnace gas, converter gas and/or flue gas, with preference being given to mixtures of coke oven gas and converter gas.

To utilize coproduct gases, in particular blast furnace gases and converter gases, efficiently as material, it can be necessary to add methane or $C_2$-$C_4$-hydrocarbons in the form of natural gas.

The multicomponent mixture of coproduct gas, accompanying gas and/or biogas, preferably coproduct gas, comprising alkanes, in particular methane, also hydrogen, water vapor, carbon monoxide, carbon dioxide and nitrogen is advantageously converted by means of the process of the invention into a defined product gas mixture comprising mainly hydrogen, water vapor, carbon monoxide, carbon dioxide, nitrogen and methane as balance. The product gas mixture advantageously comprises more than 98% by volume, preferably more than 99% by volume, in particular more than 99.5% by volume, of the substances hydrogen, water vapor, carbon monoxide, carbon dioxide, nitrogen and (as balance) methane.

The components hydrogen and carbon monoxide are advantageously present in increased concentration in the product gas mixture. When using coke oven gas, the amount of hydrogen is advantageously increased by from 30% to 300% of the (original) amount in the coke oven gas, preferably by from 50% to 200%, by the process of the invention. When using blast furnace gas, the amount of carbon monoxide is advantageously increased by from 5% to 30% of the (original) amount in the blast furnace gas, preferably by from 10% to 25%, by the process of the invention. When using converter gas, the amount of carbon monoxide is advantageously increased by from 1% to 10% of the (original) amount in the converter gas, preferably by from 2% to 6%, by the process of the invention. When using coke oven gas, the amount of carbon monoxide is advantageously increased by from 0 to 1500% of the (original) amount in the coke oven gas, preferably by from 10% to 1000%, by the process of the invention.

The following table shows the ratio of $H_2$ to CO in the product gas mixture as a function of the atomic C:H:O ratio in the coproduct gases, accompanying gases and/or biogases, independently of whether the elements were originally bound:

| C | H | O | $H_2$:CO |
|---|---|---|----------|
| 1 | 4 | 0 |  |
| 1 | 4 | 0.5 | 3.8 |
| 1 | 4 | 1 | 2.1 |
| 1 | 4 | 2 | 1.5 |
| 1 | 4 | 3 | 1.1 |
| 1 | 4 | 4 | 0.8 |

In order to control the product composition, an oxygen-comprising gas can advantageously be introduced into the reaction space, advantageously in a molar ratio of oxygen to carbon of 0-4:1, as an alternative to or in addition to carbon dioxide and/or water.

Typical compositions of coproduct gases (feed) and their gaseous products (product gas mixture) in equilibrium after pyrolysis at 1200° C. and 1 bar (output) are shown in the following table (amounts shown in % by volume).

| | | Raw gas | | | | | |
|---|---|---|---|---|---|---|---|
| | | $CH_4$ | $CO_2$ | $N_2$ | CO | $H_2$ | $H_2O$ |
| Blast furnace gas | Feed | 0 | 20% | 45% | 30% | 5% | 0 |
| | Output | 0 | 17.2% | 45% | 32.7% | 2.2% | 2.8% |
| Converter gas | Feed | 2.5% | 15% | 15% | 65% | 2.5% | 0 |
| | Output | 0 | 10.3% | 14.3% | 67.8% | 5.2% | 1.9% |
| Coke oven gas | Feed | 45% | 1% | 1% | 2% | 50% | 0 |
| | Output | 0 | 0 | 0.6% | 2.8% | 96.6% | 0 |
| Biogas | Feed | 60% | 35% | 5% | 0 | 0 | 0 |
| | Output | 0 | 0 | 2.6% | 35.5% | 61.5% | 0.4% |

The content of sulfur-comprising compounds, e.g. $H_2S$ and/or COS, in the product gas mixture is advantageously less than 0.1% by volume (1000 ppm by volume), preferably less than 0.01% by volume (100 ppm by volume), in particular less than 0.001% by volume (10 ppm by volume). The content of sulfur-comprising compounds can advantageously be reduced by from 85% to 100% compared to the coproduct gas used, preferably by from 95% to 100%, in particular by from 99% to 100%, by means of the process of the invention.

Of the solids content introduced by the coproduct gas into the process, a proportion of solids of advantageously less than 2 mg/standard $m^3$, preferably less than 0.5 mg/standard $m^3$, in particular less than 0.1 mg/standard $m^3$, remains in the product gas mixture. The proportion of solids can advantageously be reduced by from 50 to 100% compared to the coproduct gas used, preferably by from 80 to 100%, in particular by from 95 to 100%, by means of the process of the invention.

Carbon deposits within the reactor space which are undesirable in the process can advantageously be reduced by from 90 to 100%, preferably by from 95 to 100% and in particular by from 99 to 100%.

The process of the invention is advantageously carried out continuously or pseudocontinuously. The process of the invention is advantageously carried out without use of an active metal-comprising catalyst.

When using hydrocarbon-comprising, in particular methane-comprising, coproduct gas, the carbon dioxide required for the conversion of methane can be initially present in the methane-comprising coproduct gas and be introduced with this into the reaction space. However, if the carbon dioxide content of the methane-comprising coproduct gas is not sufficient to convert all of the methane, carbon dioxide is advantageously taken from a carbon dioxide source and introduced into the reaction space so that the carbon dioxide concentration in the high-temperature zone is sufficiently high for complete reaction of methane.

As an alternative to or in addition to carbon dioxide, it is possible to introduce water, advantageously in a molar ratio of water to methane of from 0.1 to 2, preferably from 0.1 to 1, into the reaction space so that at least part of the methane is reacted with water and the remainder is reacted with carbon dioxide to form hydrogen and carbon monoxide.

In a preferred embodiment of the process of the invention, a carbon dioxide-comprising coproduct gas is used as carbon dioxide source.

Carbon dioxide-comprising and methane-comprising coproduct gas can be introduced together or separately into the reaction space. However, it can also be useful to fractionate the carbon dioxide-comprising coproduct gas and only to feed carbon dioxide which has been separated off in the fractionation into the reaction space. This makes it possible to avoid introduction of undesirable materials, e.g. nitrogen which makes up about 50% by volume of the blast furnace gas, into the reaction space. Furthermore, prior removal of further undesirable materials, e.g. heavy metals in blast furnaces gases, can be advantageous. Such removal or fractionation steps can be carried out by all methods known to those skilled in the art.

The process of the invention is in principle suitable for utilization of any hydrocarbon-comprising, preferably alkane-comprising, in particular methane-comprising, and/or carbon dioxide-comprising coproduct gases. However, it is preferably used for producing a synthesis gas comprising hydrogen and carbon monoxide from coking plant gas.

When carbon dioxide-comprising coproduct gas is used, methane required for the methane conversion is appropriately taken from one or more methane sources, e.g. coking plant gas and/or natural gas, and introduced into the reaction space.

As carriers, it is possible to use all carriers known to those skilled in the art, for example α-alumina ($Al_2O_3$), fused silica ($SiO_2$), mullite ($Al_2O_3.SiO_2$), cordierite (($Mg,Fe^{2+}$)$_2$ ($Al_2Si$) [$Al_2Si_4O_{18}$]), steatite ($SiO_2.MgO.Al_2O_3$) and carbon-comprising granular materials, preferably carbon-comprising granular materials.

For the purposes of the present invention, a carbon-comprising granular material is a material which advantageously consists of solid particles which comprise at least 50% by weight, preferably at least 80% by weight, in particular at least 90% by weight, of carbon. The carbon-comprising granular material advantageously has a particle size, i.e. an equivalent diameter which can be determined by sieving using a particular mesh size, of from 0.5 to 100 mm, preferably from 1 to 80 mm. The carbon-comprising granular material is advantageously spherical. In the process of the invention, many different carbon-comprising granular materials can be used. Such a granular material can, for example, consist predominantly coal, coke, broken coke and/or mixtures thereof. Broken coke generally has a particle size of less than 20 mm. Furthermore, the carbon-comprising granular material can comprise from 0 to 15% by weight, based on the total mass of the granular material, preferably from 0 to 5% by weight, of metal, metal oxide and/or ceramic. Particular preference is given to using granular materials which comprise broken coke and/or low-value, i.e. not immediately suitable for the smelting process, coke, coking plant coke based on brown or hard coal, preferably high-porosity coking plant coke based on brown or hard coal and having a surface area of advantageously >100 $m^2/g$, preferably >250 $m^2/g$, in particular 500 $m^2/g$, and/or coke obtained from biomass.

The carbon-comprising solid which may be formed by the process of the invention, preferably carbon, advantageously deposits to an extent of at least 75% by weight, based on the total mass of the carbon formed, preferably at least 80% by weight, very particularly preferably at least 90% by weight, in particular at least 95% by weight, on the carrier, advantageously on the carbon-comprising granular material.

When carrying out the process of the invention, carbon formed therefore does not represent a problem since it is deposited predominantly on the carrier, preferably on the particles of the carbon-comprising granular material, and merely changes in size, structure and strength. The carrier, preferably the carbon-comprising granular material, filters carbon from the gas phase so that the synthesis gas produced can be taken off from the reaction space with virtually no carbon particles. The carbon content in the synthesis gas is advantageously not more than <2 mg/standard $m^3$, preferably <0.5 mg/standard $m^3$, particularly preferably <0.1 mg/standard $m^3$, in particular <0.05 mg/standard $m^3$.

Conveying gas and solid (carrier) in countercurrent gives a mode of operation with integrated heat recirculation. Here, the reaction zone is localized at the high temperature level in the middle section of the reactor while the temperature decreases in the upper and lower peripheral zones. To achieve this operating state, the gas flow and the solids flow have to be matched advantageously to one another. As a result, the solids residence time is advantageously coupled to the gas residence time in the reactor as follows:

The solids residence timer per gas residence time under standard conditions is advantageously in the range from 200 to 5000, preferably in the range from 300 to 3000, in particular from 400 to 2000.

The cross-sectional throughput of the solid is advantageously from 0.01 to 20 kg/$m^2$/s, preferably from 0.05 to 10 kg/$m^2$/s, in particular from 1 to 5 kg/$m^2$/s.

The process of the invention enables the hydrogen to carbon monoxide ratio in the synthesis gas to be controlled in accordance with requirements. An embodiment of the process of the invention makes good use of the mechanism of the deposition of carbon by introducing the gaseous starting materials into the reaction space with a molar carbon/oxygen ratio C/O of >1, so that, in addition to synthesis gas, carbon is deliberately produced and deposited on the support, preferably the particles of the carbon-comprising granular material.

On the other hand, carbon can be removed from the particles of the granular material when a molar carbon/oxygen ratio C/O of <1 is set.

In this way, a low-value granular material can be converted by targeted increase or reduction of the pore volume into a high-value coke product which can be taken off from the reactor space and used, for example, in a blast furnace or in foundries. For the purposes of the present invention, a high-value coke product are cokes which have a diameter of from 35 to 80 mm and a drum strength 140 for blast furnace coke of >40% in accordance with ISO/FDIS 18894:2003.

The thermal energy required for carrying out the process of the invention can be provided, for example, via oxidative, solar and/or electric energy sources. The energy input can be effected by all methods known to those skilled in the art.

In a preferred embodiment, thermal energy required for carrying out the process of the invention is produced by oxidation or partial oxidation of a fuel comprising hydrocarbons and/or hydrogen. As oxidant, preference is given to using air and/or oxygen-enriched air and/or technical grade oxygen. Oxidation or partial oxidation can be carried out outside the reaction space, for which purpose the fuel is mixed with an oxidant and reacted. The resulting hot gas is subsequently introduced into the reaction space and passed through the carrier, preferably the carbon-comprising granular material, during which it transfers part of its sensible heat to the carrier, preferably the carbon-comprising granular material, and/or the gases to be reacted. However, the oxidant can also be introduced into the reaction space and mixed and reacted there with a fuel which is present.

If the carbon-comprising granular material comprises low-value coking plant coke based on brown coal, hard coal or biomass, from which pyrolysis gases can be given off at elevated temperature, it can be advantageous, for the purposes of energy generation, subsequently to feed oxygen into the pyrolysis zone and at least partially oxidize the pyrolysis gases at temperatures of >1000° C. to form synthesis gas.

In another embodiment, a hot gas is produced by means of an electric heating device which is arranged outside the reaction space and through which a gas stream is conveyed and thus heated by means of an electric arc before it is introduced at a temperature in the range from 2000 to 5000° C., preferably from 3500 to 4000° C. into the high-temperature zone where it transfers its heat to the reactant or reactants. The gas stream can, for example, consist of hydrogen which is obtained in the decomposition of methane and is taken off from the reaction space and, after possible purification (e.g. removal of dust), fed to the electric heating device and at least partially ionized.

In a further preferred embodiment of the process of the invention, thermal energy is generated by electromagnetic induction in the reaction space. For this purpose, one or more electrically conductive elements are arranged in the reaction space in such a way that they can come into thermal contact with the gases to be reacted and/or the carbon-comprising granular material. An alternating electromagnetic field generates eddy currents in the electrically conductive elements which are heated up as a result. The heat generated in this way is transferred directly or indirectly to the gases to be reacted and thus covers at least part of the energy required for synthesis gas formation. The electrically conductive element or elements are fixed in place in the reaction space and/or distributed in granular form in the carbon-comprising granular material, so that they are introduced together with this into the reaction space and removed together therewith from the reaction space.

It can also be advantageous to generate thermal energy in the reaction space by means of an electric current which is passed through the carbon-comprising granular material and heats the latter.

The reaction according to the invention of hydrocarbon-comprising, preferably alkane-comprising, in particular methane-comprising, and/or carbon dioxide-comprising coproduct gas, accompanying gas and/or biogas is advantageously carried out at a temperature in the reaction zone of from 800 to 1800° C., preferably in the range from 1000 to 1600° C., in particular from 1100 to 1400° C.

The reaction according to the invention is advantageously carried out at a pressure of from atmospheric pressure to 50 bar. The process of the invention is preferably carried out in the pressure range in which the coproduct gases, accompanying gases and/or biogases are obtained.

The carrier, preferably the carbon-comprising granular material, is preferably conveyed as mobile bed, e.g. moving bed or fluidized bed, through the reaction space, with the reaction gases, in particular methane and carbon dioxide, advantageously being conveyed in countercurrent to the granular material. The reaction space is for this purpose advantageously configured as a vertical shaft so that the movement of the moving bed occurs purely under the action of gravity. However, the carrier, preferably the carbon-comprising granular material, can also be conveyed as fluidized bed through the reaction space. Both variants allow a continuous or pseudocontinuous mode of operation.

When using a moving or fluidized bed, the temperature of the carrier, preferably the carbon-comprising granular material, at the inlet into the reactor is advantageously in the range from 0 to 300° C., preferably from 10 to 150° C., in particular from 50 to 100° C. The temperature of the feed gases at the reactor inlet is advantageously in the range from 0 to 100° C., preferably from 10 to 50° C.

If the carrier, preferably the carbon-comprising granular material, is conveyed as moving bed through the reaction space, a particularly preferred variant of the process of the invention provides for the granular material to be introduced at ambient temperature, appropriately from 0 to 300° C., preferably from 10 to 150° C., in particular from 20 to 100° C., into the reaction space, there firstly being heated to a maximum temperature and subsequently being cooled again, with the maximum temperature being located in a high-temperature zone in which temperatures of more than 1000° C. prevail. Cooling can be carried out down to close to ambient temperature, so that cooling or quenching of the carbon-comprising granular material taken off from the reaction space is not necessary. To generate and maintain the temperature profile described, it is proposed that at least the methane-comprising and/or carbon dioxide-comprising coproduct gas, accompanying gas and/or biogas be introduced at ambient temperature, advantageously in the range from 0 to 100° C., preferably from 10 to 50° C., into the reaction space and be conveyed in countercurrent through the moving bed. On its way through the reaction space, the coproduct gas, accompanying gas and/or biogas exchanges heat in direct contact with the moving bed, with the coproduct gas, accompanying gas and/or biogas being heated to over 1000° C. and the moving bed being cooled at the same time. In the reaction zone, the high-temperature zone, hot synthesis gas formed is once again conveyed in countercurrent through the moving bed and cooled by direct heat exchange with the latter, so that hydrogen and carbon monoxide can be taken off from the reaction space with a temperature in the vicinity of ambient temperature, advantageously from 10 to 400° C., in particular from 20 to 200° C. Thermal energy required for the production of synthesis gas is, in particular, generated in the high-temperature zone and/or introduced into the high-temperature zone. However, generation and/or introduction of thermal energy at other places in the reaction space should not be ruled out.

In this way of carrying out the process, it is possible to cool the synthesis gas formed in the high-temperature zone very quickly, advantageously at >200 K/s, preferably >300 K/s, particularly preferably >500 K/s, in particular >1000 K/s, as a result of which the Boudouard reaction and methanation, by means of which carbon dioxide and carbon are formed from carbon monoxide in the first case and methane is formed from hydrogen and carbon in the second case, can be effectively suppressed. The yield loss of CO and $H_2$ in the cooling zone relative to the yield at maximum temperature is advantageously less than 10%, preferably less than 5%, particularly preferably less than 3%, in particular less than 2%.

The invention provides a circuit formed by carrier material, preferably carbon-comprising granular material, through which part of the synthesis gas formed in the high-temperature zone is conveyed in countercurrent and thereby cooled. The use of a heat tube via which heat is removed from the synthesis gas is likewise possible. Both the heat removed via the granular material circuit and that removed via the heat tube can be utilized for preheating starting materials. When the process is part of a heat-integrated combination site, the sensible heat of the synthesis gas can be exported to other processes. In this case, it is not necessary to provide a heat transfer zone for cooling the synthesis gas or to provide circulation of the solid in the pyrolysis reactor.

The particles which constitute the carbon-comprising product taken off from the reaction space have a degree of scatter in their particle size and in their density, so that direct utilization of the carbon-comprising product as, for example, blast furnace coke is only sometimes possible. A blast furnace coke advantageously has a particle size in the range from 35 to 80 mm and a density in the range from 0.9 g/cm$^3$ to 1.1 g/cm$^3$. According to the invention, the carbon-comprising granular material taken off from the reaction space is therefore classified by sieving and/or classification. Particles which are within the required specification are discharged as product. Particles whose diameters are too small or whose density is too low or too high for the intended use are preferably recirculated to the same reaction space or a reaction space operated in parallel. Particles having diameters which are too large are crushed before recirculation, with the fines being recirculated.

In an embodiment of the process of the invention, a gas occurring in the process, i.e. hydrogen or synthesis gas, is therefore advantageously purified by being passed through a bed of coke comprising, for example, brown coal coke and/or hard coal coke and thus freed of substances which are in themselves undesirable in the synthesis gas or can be converted in the reaction space into undesirable substances. Depending on its quality, the coke loaded with undesirable substances during the gas purification can advantageously be disposed of by combustion or passed to a coking plant as feed.

The process of the invention makes it possible to utilize, as material, the multicomponent mixture of coproduct gas, accompanying gas and/or biogas comprising hydrocarbons, in particular methane, and/or carbon dioxide by purification and conversion into synthesis gas and/or hydrogen. Hydrogen, carbon monoxide and/or a mixture of hydrogen and carbon monoxide can subsequently be separated off from the synthesis gas formed in the reaction of methane and either be themselves passed on as products or be used for producing products such as methanol, dimethyl ether or hydrocarbons having a basic skeleton of greater or equal to two carbon atoms.

An advantage in the utilization as material of the coproduct gases, accompanying gases and/or biogases is, apart from the saving of the $CO_2$ emission which would be formed on flaring, that compared to combustion in the flare an up to 25% higher percentage of the coproduct gas composition can be utilized by the reaction of carbon dioxide.

All components of the product gas mixture with the exception of nitrogen can be utilized in terms of material as C, CO and $H_2$; the percentage of utility as material in respect of the three components mentioned is advantageously greater than 95%, preferably greater than 98%, in particular greater than 99%.

In the following, the invention is illustrated with the aid of an example shown schematically in FIG. 1.

FIG. 1 shows a variant of the process of the invention in which methane is reacted with carbon dioxide in a continuous process to form synthesis gas and blast furnace coke. A carbon-comprising granular material, for example broken coke, is introduced at ambient temperature via feed line 1 from above into the reaction space R through which it is subsequently conveyed downward under the action of gravity in a moving bed W. At the same time, a methane-comprising coproduct gas 2, for example coking plant gas, and optionally additionally natural gas are introduced together with carbon dioxide 9 from below into the reaction space R and conveyed in countercurrent upward through the moving bed W. The gases 2 and 9, which on entry into the reaction space R are at ambient temperature, are heated on their way upward by direct heat exchange with the moving bed W. In the high-temperature zone H, in which temperatures of more than 1000° C. prevail, primarily methane and carbon dioxide react to form hydrogen and carbon monoxide, producing a synthesis gas. However, carbon is also formed by thermal decomposition of methane and the Boudouard reaction and this predominantly deposits on the carbon-comprising particles of the moving bed W. The hot synthesis gas formed continues to flow upward and is cooled by direct heat exchange with the moving bed W, so that synthesis gas having a temperature which may be above ambient temperature but is at least 500 K below the reaction temperature can be taken off via line 3. In the separation apparatus T, hydrogen 4 is separated off from the synthesis gas and is subsequently converted into a hot gas 5 by means of an electric arc in the electric heating device P. The hot gas 5 is introduced at a temperature in the range from 2000 to 5000° C. into the high-temperature zone H and there provides the major part of the energy required for the production of synthesis gas. At the bottom end of the reaction space R, granular material 6 is taken off at virtually ambient temperature and this can, owing to the carbon deposits, be used, for example, as blast furnace coke or coking plant additive. Constituents of the granular material 6 which do not meet the quality requirements because they have a diameter which is too large (>80 mm) or too small (<35 mm) or have a strength which is too low (drum strength 140 for blast furnace coke>40% in accordance with ISO/FDIS 18894:2003) are separated off in the separation apparatus S by sieving and/or classification and, after possible comminution, are recirculated via line 7 to the reaction space R. The remaining material 8 is blast furnace coke which is passed on as high-value product.

The invention claimed is:

1. A process for utilizing a gaseous starting material containing hydrocarbons and carbon dioxide comprising:
    contacting the gaseous starting material containing hydrocarbons and carbon dioxide with a carrier in a reaction space having high temperature zone at a temperature ranging from 1,100 to 1,400° C. to produce a synthesis gas that contains more than 95% of a mixture of CO, $CO_2$, $H_2$, $H_2O$, $CH_4$ and $N_2$, and
    cooling the synthesis gas at >200 K/s;
    wherein the carrier is conveyed through the reaction space on a moving bed, the gaseous starting material containing hydrocarbons and carbon dioxide is conveyed in countercurrent to the carrier at a flow velocity of less than 20 m/s, and a solids residence time per unit gas residence time under standard conditions is in the range from 200 to 5,000;
    wherein the synthesis gas is conveyed in countercurrent to the moving bed and is cooled by contact with the moving bed, and
    wherein the gaseous starting material containing hydrocarbons and carbon dioxide is a coproduct gas, an accompanying gas, and/or a biogas.

2. The process according to claim 1, wherein the flow velocity of the gaseous starting material through the reaction space is less than 10 m/s.

3. The process according to claim 1, wherein the gaseous starting material is a coproduct gas that contains carbon dioxide.

4. The process according to claim 1, wherein the molar carbon/oxygen ratio of the gaseous starting materials is set to greater than 1.

5. The process according to claim 1, wherein the molar carbon/oxygen ratio of the gaseous starting materials is set to less than 1.

6. The process according to claim 1, wherein the carrier is a granular material comprising carbon.

7. The process according to claim 1, wherein the carrier is introduced into the reaction space at a temperature of from 0 to 300° C.

8. The process according to claim 1, wherein hydrogen and carbon monoxide are taken off from the reaction space with a temperature of from 10 to 400° C.

9. The process according to claim 1, which is carried out without using a catalyst comprising an active metal.

10. The process according to claim 1, wherein the gaseous starting material is introduced at a molar carbon/oxygen ratio C/O of >1 into the reaction space so that, in addition to synthesis gas, carbon is produced in a targeted manner and deposited on a granular carbon-containing carrier.

11. A method of using carbon produced according to the process of claim 10 in a blast furnace or in a foundry.

12. The process according to claim 1, wherein the produced synthesis gas contains more than 98% of a mixture of CO, $CO_2$, $H_2$, $H_2O$, $CH_4$ and $N_2$.

13. The process according to claim 1, further comprising introducing water into the reaction space, at a molar ratio of water to methane in a range from 0.1 to 2.

14. The process according to claim 1, wherein a cross-sectional throughput of the solids is from 0.01 to 5 kg/m$^2$/s.

* * * * *